United States Patent
Kim

(10) Patent No.: US 7,630,792 B2
(45) Date of Patent: *Dec. 8, 2009

(54) APPARATUS AND METHOD FOR DETECTING POSITION OF MOBILE ROBOT

(75) Inventor: Se-Wan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 788 days.

This patent is subject to a terminal disclaimer.

(21) Appl. No.: 10/814,146

(22) Filed: Apr. 1, 2004

(65) Prior Publication Data

US 2005/0137748 A1 Jun. 23, 2005

(30) Foreign Application Priority Data

Dec. 22, 2003 (KR) .................. 10-2003-0094949

(51) Int. Cl.
*G05D 1/02* (2006.01)
*G05B 19/00* (2006.01)

(52) U.S. Cl. .............. 700/245; 700/258; 700/259; 700/262; 700/255; 701/23; 367/127; 367/87; 318/568.12; 180/167

(58) Field of Classification Search .............. 700/245, 700/259
See application file for complete search history.

(56) References Cited

U.S. PATENT DOCUMENTS

| | | | | |
|---|---|---|---|---|
| 4,207,571 A * | 6/1980 | Passey | .......... | 342/464 |
| 4,701,893 A * | 10/1987 | Muller et al. | .......... | 367/87 |
| 4,758,691 A * | 7/1988 | De Bruyne | .......... | 178/18.09 |
| 4,813,025 A * | 3/1989 | Rowland et al. | .......... | 367/6 |
| 5,440,216 A | 8/1995 | Kim | | |
| 5,491,670 A | 2/1996 | Weber | | |
| 5,652,593 A * | 7/1997 | Rench et al. | .......... | 342/458 |
| 5,758,298 A * | 5/1998 | Guldner | .......... | 701/23 |
| 5,819,008 A * | 10/1998 | Asama et al. | .......... | 700/255 |
| 6,327,219 B1 * | 12/2001 | Zhang et al. | .......... | 367/128 |
| 6,459,955 B1 * | 10/2002 | Bartsch et al. | .......... | 700/245 |
| 7,024,278 B2 * | 4/2006 | Chiappetta et al. | .......... | 700/245 |
| 7,328,088 B2 * | 2/2008 | Kim et al. | .......... | 700/259 |
| 2002/0031050 A1 * | 3/2002 | Blevins et al. | .......... | 367/127 |
| 2003/0001777 A1 * | 1/2003 | Johnson | .......... | 342/387 |
| 2004/0158354 A1 * | 8/2004 | Lee et al. | .......... | 700/245 |
| 2005/0021179 A1 * | 1/2005 | Kim et al. | .......... | 700/245 |

FOREIGN PATENT DOCUMENTS

JP 60107580 6/1985

(Continued)

*Primary Examiner*—Thomas G Black
*Assistant Examiner*—Lin B Olsen
(74) *Attorney, Agent, or Firm*—Birch, Stewart, Kolasch & Birch, LLP

(57) ABSTRACT

An apparatus and a method for detecting a position of a mobile robot in accordance with the present invention can accurately detect a position of a mobile robot by calculating time taken for each ultrasonic signal generated by ultrasonic signal oscillating means of a charging station to reach the mobile robot on the basis of a point of time at which an RF (Radio Frequency) signal emitted from the mobile robot is generated; calculating a distance between the charging station and the mobile robot based on the calculated reaching time; and calculating an angle between the charging station and the mobile robot based on the calculated distance value and a preset distance value between the ultrasonic signal oscillating means.

15 Claims, 3 Drawing Sheets

FOREIGN PATENT DOCUMENTS

| | | |
|---|---|---|
| JP | 60-213877 A | 10/1985 |
| JP | 63266377 | 11/1988 |
| JP | 4-210704 A | 7/1992 |
| JP | 05-341031 | 12/1993 |
| JP | 08-54926 | 2/1996 |
| JP | 10-332807 A | 12/1998 |

* cited by examiner

APPARATUS AND METHOD FOR DETECTING POSITION OF MOBILE ROBOT

This nonprovisional application claims priority under 35 U.S.C. § 119(a) on Patent Application No. 94949/2003 filed in KOREA on Dec. 22, 2003, which is herein incorporated by reference.

BACKGROUND OF THE INVENTION

1. Field of the Invention

The present invention relates to a mobile robot, and particularly, to an apparatus and a method for detecting a position of a mobile robot.

2. Description of the Background Art

In general, a mobile robot, particularly, a robot cleaner is a device for automatically cleaning an area to be cleaned by sucking foreign substances such as dust or the like on a floor, while automatically moving along a wall surface of a room (e.g., living room, inner room or the like) of a private home without an operation of a user.

The robot cleaner discriminates a distance between itself and an obstacle installed in a cleaning area, such as furniture, office supplies, a wall or the like, through a distance sensor, and selectively drives a motor for driving its left wheel and a motor for driving its right wheel depending on the discriminated distance, so that the robot cleaner automatically switches its direction to clean the cleaning area. Herein, the robot cleaner performs cleaning, moving in the cleaning area through map information stored in an internal storing device.

Hereinafter, a mapping operation for generating the map information will now be described.

First, the robot cleaner moves along a side surface of an operation space (e.g., wall surface of living room in private home), to calculate a distance and a direction between itself and a charging station installed on a wall, and determines its position based on the calculated distance value and direction value, to scan the operation space. Herein, the robot cleaner detects its current position by using an encoder installed at its wheel.

The robot cleaner determines whether there is an obstacle between itself and the charging station. If there is no obstacle, the robot cleaner transmits/receives a signal to/from the charging station to scan an operation space. On the contrary, if there is an obstacle between the robot cleaner and the charging station, the robot cleaner scans another operation space first, and then, when the obstacle is eliminated, it transmits/receives a signal to/from the charging station to scan the operation space where the obstacle has eliminated.

However, in the method of detecting a position of the robot cleaner by using the encoder, since the current position of the robot cleaner is searched using the encoder installed at the wheel, an error occurs by sliding of the wheel or an idle rotation.

As another method for detecting a position of a robot cleaner in accordance with another conventional art, stickers or reflection plates with the same shapes are attached to an operation space (e.g., wall surface of living room of private home) at prescribed intervals, and the robot cleaner recognizes the sticker or the reflection plate by using a CCD camera to thereby compensate an error occurring by sliding of the wheel or an idle rotation, so that the robot cleaner recognizes a distance between itself and the charging station. However, in this method of detecting a position of the robot cleaner by using the sticker or the reflection plate, when illumination brightness of a cleaning area is changed or a subject having a shape similar to the sticker or the reflection plate is recognized, a distance error may be accumulated.

In addition, when illumination brightness is higher or lower than a threshold, a CCD (charge-coupled device) camera cannot recognize the sticker or the reflection plate, and thus the robot cleaner cannot check its position. In addition, since the CCD camera has to be attached to the robot cleaner, fabrication cost of the robot cleaner is increased.

Techniques for a robot cleaner in accordance with conventional arts are also disposed in U.S. Pat. No. 5,440,216 and U.S. Pat. No. 5,646,494.

SUMMARY OF THE INVENTION

Therefore, an object of the present invention is to provide an apparatus and a method for detecting a position of a mobile robot capable of accurately detecting a position of the mobile robot by calculating reaching time taken for each ultrasonic signal to be received by the mobile robot after being oscillated by ultrasonic signal oscillating means of a charging station on the basis of an RF (radio frequency) signal emitted at certain time intervals and a distance value between the ultrasonic signal oscillating means and thus by detecting a position of the mobile robot based on the calculated values.

To achieve these and other advantages and in accordance with the purpose of the present invention, as embodied and broadly described herein, there is provided a method for detecting a position of a mobile robot comprising: calculating time taken for each ultrasonic signal generated by ultrasonic signal generated means of a charging station to reach the mobile robot on the basis of a point of time at which a RF (Radio Frequency) emitted from the mobile robot is emitted, and calculating a distance between the charging station and the mobile robot based on the calculated reaching time; and calculating an angle between the charging station and the mobile robot based on the calculated distance value and a preset distance value between the ultrasonic signal oscillating means.

To achieve these and other advantages and in accordance with the purpose of the present invention, as embodied and broadly described herein, there is provided an apparatus for detecting a position of a mobile robot generating an RF (Radio Frequency) signal and ultrasonic signals, calculating reaching time taken for each ultrasonic signal to reach the mobile robot on the basis of a point of time at which the RF signal is generated, and detecting a position of the mobile robot based on the reaching time and a preset distance value between the ultrasonic signal oscillating means for oscillating the ultrasonic signals.

To achieve these and other advantages and in accordance with the purpose of the present invention, as embodied and broadly described herein, there is provided an apparatus for detecting a position of a mobile robot comprising: an RF generating means installed at a mobile robot and for emitting an RF (Radio Frequency) signal; an RF reception means installed at a charging station and for receiving the RF signal emitted by the RF generating means; ultrasonic signal oscillating means each installed at the charging station and for oscillating ultrasonic signals; a control means for controlling the ultrasonic signal oscillating means so that the ultrasonic signals are oscillated whenever the RF signal is received by the RF reception means; ultrasonic signal reception means installed on an outer circumferential surface of the mobile robot and for receiving the ultrasonic signals oscillated by the ultrasonic signal oscillating means; and a microcomputer installed in the mobile robot and for calculating a distance and an angle between the mobile robot and the charging station based on reaching time taken for each ultrasonic signal to reach the mobile robot and a preset distance value between the ultrasonic signals oscillating means.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Hereinafter, a preferred embodiment of an apparatus and a method for detecting a position of a mobile robot capable of accurately detecting a position of the mobile robot by calculating time taken for each ultrasonic signal generated by ultrasonic signal oscillating means of a charging station to reach the mobile robot, on the basis of a point of time at which an RF signal (Radio Frequency signal) is generated; calculating a distance between the charging station and the mobile robot based on the calculated reaching time; and calculating an angle between the charging station and the mobile robot based on the calculated distance value and a preset distance values between the ultrasonic signal oscillating means, will now be described in detail with reference to FIGS. 1 through 3.

Figure 1:
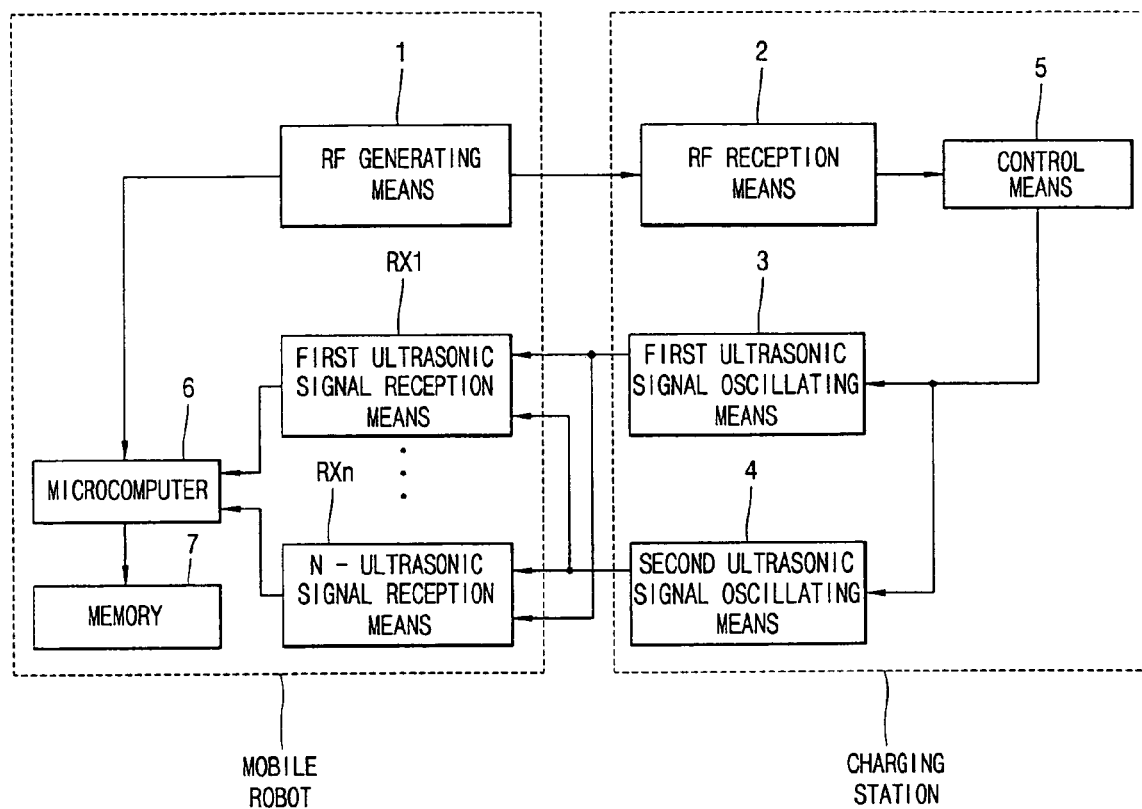
FIG. 1 is a block diagram showing a construction of an apparatus for detecting a position of a mobile robot in accordance with an embodiment of the present invention.

FIG. 1 is a block diagram showing a construction of an apparatus for detecting a position of a mobile robot in accordance with an embodiment of the present invention.

As shown therein, an apparatus for detecting a position of a mobile robot in accordance with an embodiment of the present invention includes: an RF generating means 1 installed at a prescribed position of a mobile robot and for emitting an RF signal (radio frequency signal) for detecting a position of the mobile robot at certain time intervals; an RF reception means 2 installed at a prescribed position of a charging station fixed on a place such as a wall surface of a private home and for receiving the RF signal emitted by the RF generating means 1; first and second ultrasonic signal oscillating means 3, 4 each installed at a prescribed position of the charging station and for sequentially oscillating first and second ultrasonic signals for calculating a distance and an angle between the mobile robot and the charging station; a control means 5 installed at a prescribed position of the charging station and for controlling the first and second ultrasonic signal oscillating means 3, 4 so that the first and second ultrasonic signals are sequentially oscillated whenever the RF signal is received by the RF reception means 2; a plurality of ultrasonic signal reception means (Rx1~Rxn) installed on an outer circumferential surface of the mobile robot at certain intervals therebetween and for sequentially receiving the first and second ultrasonic signals oscillated by the first and second oscillating means 3, 4; a microcomputer 6 installed inside the mobile robot and for calculating a distance and an angle between the mobile robot and the charging station based on reaching time of each of first and second ultrasonic signals and a preset distance value between the first and second ultrasonic signal oscillating means 3, 4; and a memory 7 for storing position numbers for discriminating the positions of the plurality of ultrasonic signal reception means (Rx1~Rxn) and the preset distance value between the first and second ultrasonic signal oscillating means 3, 4.

Hereinafter, operations of the apparatus for detecting a position of the mobile robot in accordance with an embodiment of the present invention will now be described.

First, when the mobile robot moving in a cleaning area along a preset moving pattern, the microcomputer 6 controls the RF generating means 1 in order to detect positions of the mobile robot at preset time intervals.

The RF generating means 1 generates an RF signal for detecting positions of the mobile robot at preset time intervals (e.g., at 3-second intervals) under the control of the microcomputer 6, and emits the generated RF signal.

The RF reception means 2 positioned at the charging station receives the RF signal and outputs a first notifying signal for notifying that the RF signal has been received, to the control means 5 positioned at the charging station. At this time, the control means 5 controls the first and second ultrasonic signal oscillating means 3, 4, at preset time intervals based on the first notifying signal.

The first and second ultrasonic signal oscillating means 3, 4 sequentially oscillate first and second ultrasonic signals under the control of the control means 5. Herein, a plurality of first and second ultrasonic signal oscillating means may be installed and also the plurality of first and second ultrasonic signal oscillating means may be installed at prescribed positions of the charging station to be symmetric to each other in a horizontal direction or may be installed at prescribed positions of the charging station to be symmetric to each other in vertical and horizontal directions. The charging station is fixedly installed on a wall surface of a private home or the like in order to charge a battery (not shown) of the mobile robot.

Thereafter, the plurality of ultrasonic signal reception means (Rx1~Rxn) installed at the mobile robot receives the sequentially-oscillated first and second ultrasonic signals and outputs a second notifying signal for notifying that the first and second ultrasonic signals have been received, to the microcomputer 6.

Based on the second notifying signal the microcomputer 6 calculates the time taken for each of first and second ultrasonic signals to reach one or more ultrasonic signal reception means (Rx1~Rxn) after being oscillated by the ultrasonic signal oscillating means 3, 4. Then, the microcomputer 6 calculates a distance and an angle between the mobile robot and the charging station based on the calculated reaching time and a preset distance value between the first and second ultrasonic signal oscillating means 3, 4, thereby detecting a current position of the mobile robot. Then, the microcomputer 6 compensates a current position error of the mobile robot based on the detected position value.

In addition, the microcomputer 6 checks positions of the ultrasonic signal reception means (e.g., Rx1, Rx2) which have received the first and second ultrasonic signals, among the plurality of ultrasonic signal reception means (Rx1~Rxn), by discriminating the pertinent ultrasonic signal reception means through the position numbers prestored in the memory 7. That is, the microcomputer 6 detects a direction that the mobile robot proceeds through the preset position number of the ultrasonic signal reception means which has received an ultrasonic signal.

For example, an outer shape of the mobile robot is round, the rear of the mobile robot (opposite direction that the mobile robot proceeds) is zero degree, a first ultrasonic signal reception means (Rx1) is installed at a position of zero degree, and a second ultrasonic signal reception means (Rx2) is installed at a position apart from the first ultrasonic signal reception means at an interval of 30 degrees therebetween. That is, the first and second ultrasonic signal reception means (Rx1, Rx2) are adjacently installed. At this time, assuming that a position number of first ultrasonic signal reception means (Rx1) is "1", and a position number of second ultrasonic signal reception means (Rx2) is "2", when the first and second ultrasonic signals are received by the first and second ultrasonic signal reception means (Rx1, Rx2), the microcomputer 5 can accurately recognize that the mobile robot is moving in a direction opposite to the charging station through those position numbers since the first and second ultrasonic signal reception means (Rx1, Rx2) are installed at the rear of the outer circumferential surface of the mobile robot.

Hereinafter, processes for calculating a distance and an angle between the mobile robot and the charging station will now be described.

First, the microcomputer 6 detects reaching time taken for each of first and second ultrasonic signals to be received by one or more ultrasonic signal reception means (Rx1~Rxn) after being sequentially oscillated by the first and second ultrasonic signal oscillating means 3, 4, on the basis of a point of time at which an RF signal, which is generated at preset time intervals, is generated. Then, the microcomputer 6 calculates a distance between the mobile robot and the charging station based on the detected reaching time. Herein, the first and second ultrasonic signals may be received by one ultrasonic signal reception means (e.g., Rx1) or may be received by two or more ultrasonic signal reception means (e.g., Rx1~Rx3).

For example, the microcomputer 6 detects reaching time taken for each of first and second ultrasonic signals to be received by one or more ultrasonic signal reception means (Rx1~Rxn) after being oscillated by the first and second ultrasonic signal oscillating means 3, 4, on the basis of a point of time at which an RF signal, which is generated at preset time intervals, is generated. Then, the microcomputer 6 calculates a distance between the mobile robot and the charging station based on the detected reaching time. That is, when first and second ultrasonic signals are detected only in one ultrasonic signal reception means (Rx1), the microcomputer 6 calculates a distance value between the one ultrasonic signal reception means (Rx1) and the charging station based on the reaching time taken for each of first and second ultrasonic signals to be received by the one ultrasonic signal reception means (Rx1), and calculates an actual distance between the mobile robot and the charging station by adding a semidiameter of the mobile robot to the calculated distance value. In addition, an angle between the mobile robot and the charging station is calculated through triangulation based on the reaching time of each of first and second ultrasonic signals and a preset distance value between the first and second ultrasonic signal oscillating means 3, 4.

On the other hand, when first and second ultrasonic signals are detected in two ultrasonic signal reception means (e.g., Rx1, Rx2), the microcomputer 6 calculates distances between the mobile robot and the charging station based on reaching time of each of first and second ultrasonic signals. Then, the microcomputer 6 calculates an angle between the mobile robot and the charging station through triangulation based on each obtained distance value and a preset distance value between the first and second ultrasonic signal oscillating means 3, 4.

Herein, the microcomputer 6 detects a distance (s) between the ultrasonic signal reception means and the ultrasonic signal oscillating means through expression 1 below.

$$S = 340[m/\sec] \times (T1 - T2) \quad \text{expression 1}$$

Herein, 340[m/sec] is the sound velocity, T1 is time taken to receive an ultrasonic signal, and T2 is time taken to oscillate an ultrasonic signal after receiving an RF signal.

Hereinafter, operations of an apparatus for detecting a position of a mobile robot in accordance with an embodiment of the present invention will now be described in detail with reference to FIGS. 2, 3.

Figure 2:
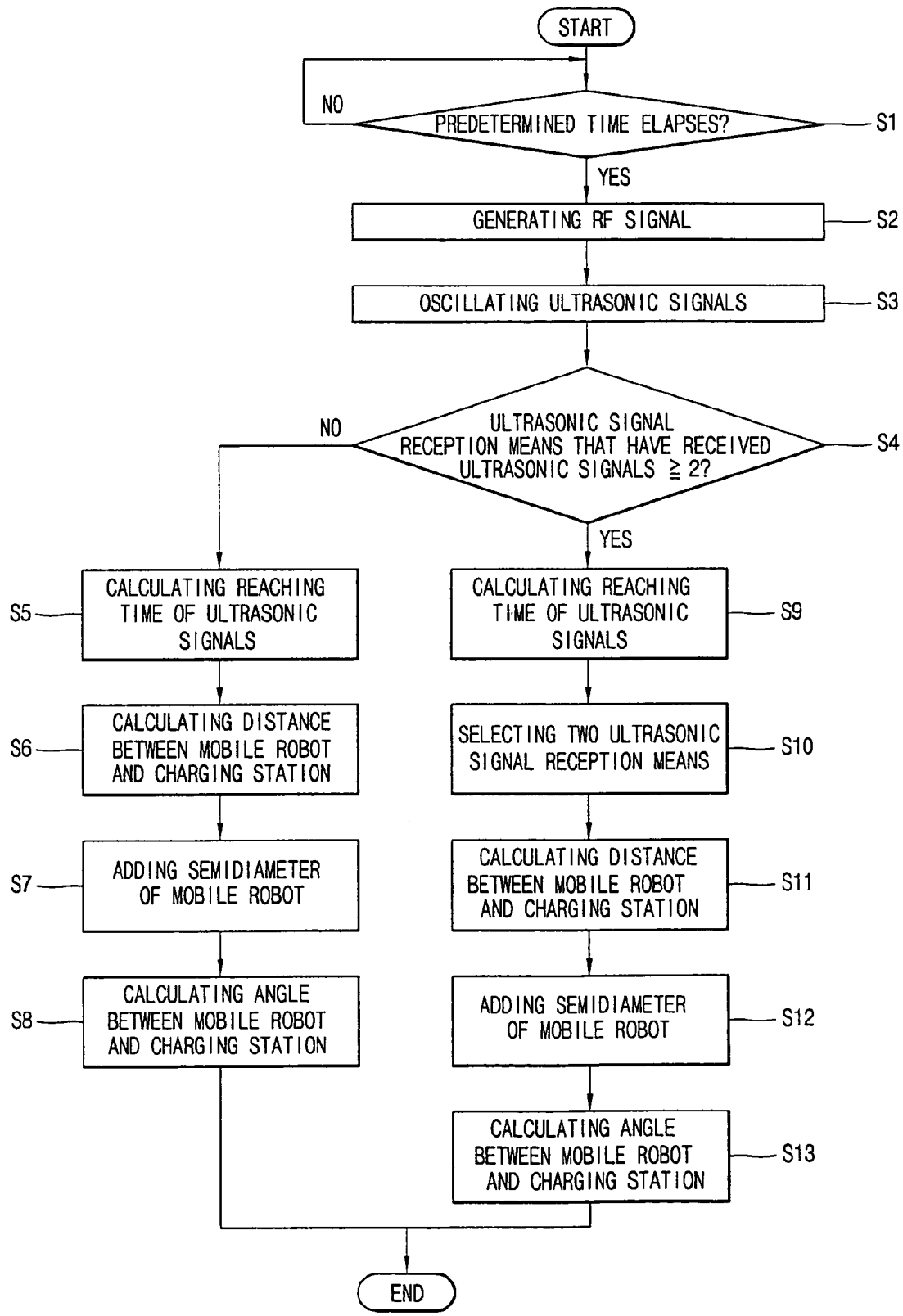
FIG. 2 is a flow chart of a method for detecting a position of mobile robot in accordance with an embodiment of the present invention.

FIG. 2 is a flow chart of a method for detecting a position of a mobile robot in accordance with an embodiment of the present invention.

Figure 3:
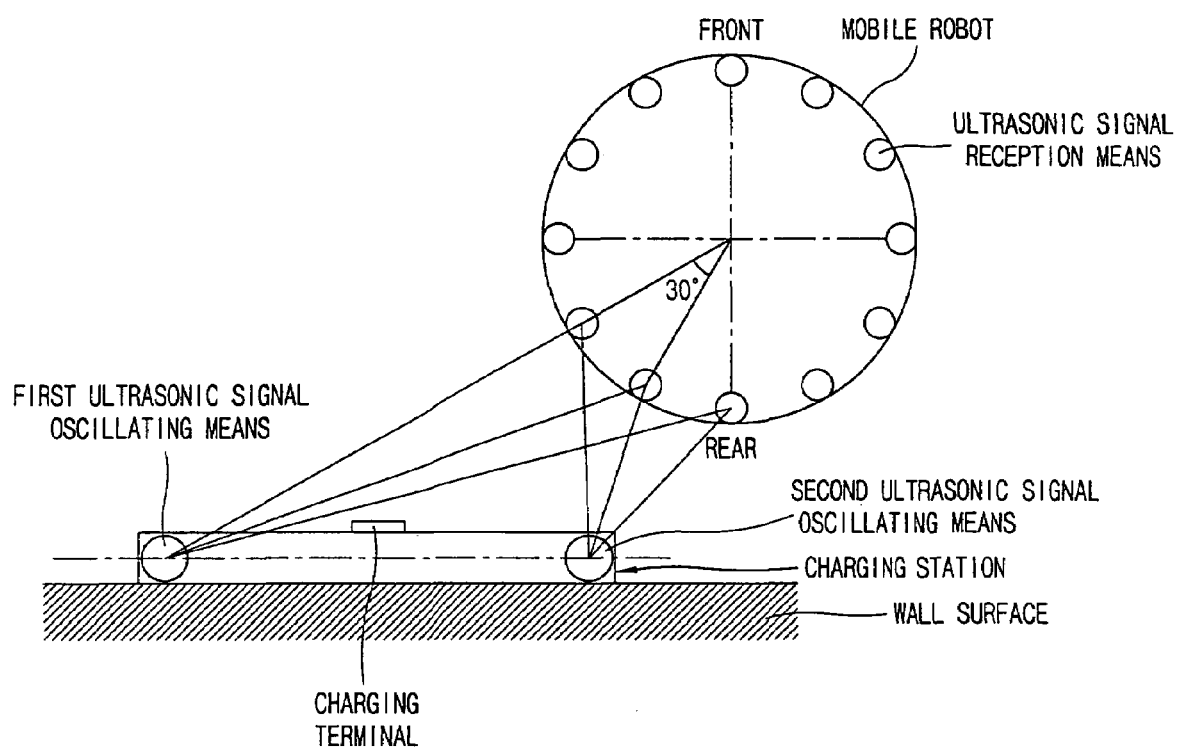
FIG. 3 is a schematic view showing a process of calculating a distance and an angle between a mobile robot and a charging station in accordance with an embodiment of the present invention.

FIG. 3 is a schematic view showing processes for calculating a distance and an angle between a mobile robot and a charging station in accordance with the present invention.

First, when predetermined time elapses (S1), the RF generating means 1 generates an RF signal (S2). The RF signal is generated whenever predetermined time elapses.

First and second ultrasonic signal oscillating means 3, 4 each installed at the charging station sequentially oscillate first and second ultrasonic signals on the basis of a point of time at which the RF signal is generated (S3). Herein, the first ultrasonic signal is oscillated earlier than the second ultrasonic signal. Accordingly, when detecting actual reaching time of the second ultrasonic signal oscillated when predetermined time elapses after the oscillation of the first ultrasonic signal, the microcomputer 6 detects the actual reaching time of the second ultrasonic signal by subtracting the predetermined time from the reaching time of the second ultrasonic signal including the predetermined time.

Thereafter, the microcomputer 6 detects time (reaching time) taken for each of first and second ultrasonic signals to be received by one or more ultrasonic signal reception means, and then calculates a distance and an angle between the mobile robot and the charging station based on the detected reaching time and a preset distance value between the first and second ultrasonic signals oscillating means 3, 4. Herein, the first and second ultrasonic signals may be received by one, or two or more ultrasonic signal reception means according to a position of the mobile robot.

Hereinafter, there will be sequentially described processes for detecting a position of a mobile robot when first and second ultrasonic signal are received by one ultrasonic signal reception means (e.g., Rx1) and received by two or more ultrasonic signal reception means (e.g., Rx1~Rx3).

First, the microcomputer 6 determines whether two or more ultrasonic signal reception means receive the first and second ultrasonic signals (S4). For example, when the first and second ultrasonic signal are detected only in one ultrasonic signal reception means (Rx1), the microcomputer 6 calculates a distance value between the one ultrasonic signal reception means (Rx1) and the charging station based on reaching time of the detected first and second ultrasonic signals. For example, the microcomputer 6 calculates reaching time of the first ultrasonic signal (S5) and calculates distances between the ultrasonic reception means (Rx1) and each first and second ultrasonic signal oscillating means 3, 4 (S6).

In addition, by adding a semidiameter of the mobile robot to the distance value between the ultrasonic signal reception means (Rx1) and the charging station, the microcomputer 6 calculates an actual distance between the mobile robot and the charging station (S7). Herein, an angle between the mobile robot and the charging station is calculated through a triangulation based on a distance value between the ultrasonic signal reception means (Rx1) and the first ultrasonic signal oscillating means 3 of the charging station, a distance value between the ultrasonic signal reception means (Rx1) and the second ultrasonic signal oscillating means 4, and a preset distance value between the first and second ultrasonic signal oscillating means (S8).

When first and second ultrasonic signals are received by two or more ultrasonic signals reception means (e.g., Rx1~Rx3), the microcomputer 6 calculates reaching time of the first and second ultrasonic signals received by the two or more ultrasonic signal reception means (Rx1~Rx3) (S9). In order to reduce a calculation amount of the microcomputer 6, the microcomputer 6 selects two ultrasonic signal reception means (e.g., Rx1 and Rx2) which have received ultrasonic signals reaching time of which are the fastest, among the calculated reaching time values (S10), and calculates distance values between the charging station and each of two selected ultrasonic signal reception means based on the reaching time of the first and second ultrasonic signals received by the two selected ultrasonic signal reception means (S11).

In addition, by adding a semidiameter of the mobile robot to a distance value between the charging station and each of two selected ultrasonic signal reception means (e.g., Rx1 and Rx2), the microcomputer calculates an actual distance between the mobile robot and the charging station (S12).

Thereafter, the microcomputer 6 calculates an angle between the mobile robot (e.g., Rx1 and Rx2) and the charging station through triangulation based on actual distance values between the charging station and the two selected ultrasonic reception means (e.g., Rx1 and Rx2) and a preset distance value between the first and second ultrasonic signal oscillating means 3, 4 (S13).

In addition, the microcomputer 6 detects a direction that the mobile robot proceeds through position numbers of two ultrasonic signal reception means which have received the first and second ultrasonic signals, to check a current position of the mobile robot, and compensates a position error of the mobile robot depending on the checked position.

Whenever predetermined time elapses (S1), the processes (S2~S13) for detecting a position of the mobile robot is repeatedly performed.

As so far described, an apparatus and a method for detecting a position of a mobile robot in accordance with the present invention can accurately detect a position of a mobile robot by calculating time taken for each ultrasonic signal generated by ultrasonic signal oscillating means of a charging station to reach the mobile robot on the basis of a point of time at which an RF (Radio Frequency) signal emitted from the mobile robot is generated; calculating a distance between the charging station and the mobile robot based on the calculated reaching time; and calculating an angle between the charging station and the mobile robot based on the calculated distance value and a preset distance value between the ultrasonic signal oscillation means.

In addition, an apparatus and a method for detecting a position of a mobile robot in accordance with the present invention accurately detect a current position of a mobile robot without using a high-priced CCD camera, to thereby reduce fabrication cost of the mobile robot.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for detecting a position of a mobile robot, the method comprising:
   storing position numbers for discriminating positions of a plurality of ultrasonic signal reception units;
   oscillating ultrasonic signals sequentially using a plurality of ultrasonic signal oscillating units of a charging station after receiving a radio frequency (RF) signal emitted at preset time intervals from the mobile robot;
   calculating time taken for each ultrasonic signal generated by the plurality of ultrasonic signal oscillating units of the charging station to reach the mobile robot;
   calculating a distance between the charging station and the mobile robot based on the calculated reaching time;
   calculating an angle between the charging station and the mobile robot based on the calculated distance value and a preset distance value between the plurality of ultrasonic signal oscillating units; and
   detecting a proceeding direction of the mobile robot by receiving the ultrasonic signals.

2. The method of claim 1, wherein the angle between the charging station and the mobile robot is calculated through triangulation based on the calculated distance value and the preset distance value between the plurality of ultrasonic signal oscillating units.

3. The method of claim 1, further comprising adding a semidiameter of the mobile robot to the distance value between the charging station and the mobile robot.

4. The method of claim 1, wherein the distance value between the charging station and the mobile robot is detected through expression $S=340[m/sec]\times(T1-T2)$, wherein $340[m/sec]$ is sound velocity, T1 is time taken to receive an ultrasonic signal, and T2 is time taken to oscillate an ultrasonic signal after receiving an RF signal.

5. The method of claim 1, wherein, wherein when the ultrasonic signals are detected only in one of the ultrasonic signal reception units, calculating a distance value between the one of the ultrasonic signal reception units and the charging station based on a reaching time of each of the detected ultrasonic signals, and calculating an actual distance between the mobile robot and the charging station by adding a semidiameter of the mobile robot to the calculated distance value, and wherein, when the ultrasonic signals are detected by two or more ultrasonic signals reception units, calculating a reaching time taken for each ultrasonic signal to be received by the two or more ultrasonic signal reception units, selecting two ultrasonic signal reception units which have received ultrasonic signals whose reaching time is the fastest, among the calculated reaching time values, and calculating a distance between the mobile robot and the charging station based on the reaching time of the ultrasonic signals which have been received by the two selected ultrasonic signal reception units.

6. An apparatus for detecting a position of a mobile robot, the apparatus comprising:

an RF generating unit installed at a mobile robot and configured to emit an RF(Radio Frequency) signal;

an RF reception unit installed at a charging station and configured to receive the RF signal emitted by the RF generating unit;

a plurality of ultrasonic signal oscillating units each installed at the charging station and for oscillating ultrasonic signals;

a control unit configured to control the ultrasonic signal oscillating units so that the ultrasonic signals are oscillated sequentially whenever the RF signal is received by the RF reception unit;

a plurality of ultrasonic signal reception units each installed on an outer circumferential surface of the mobile robot and configured to receive the ultrasonic signals oscillated by the plurality of ultrasonic signal oscillating units; and a microcomputer installed in the mobile robot and configured to calculate a distance and an angle between the mobile robot and the charging station based on reaching time taken for each ultrasonic signal to reach the mobile robot and a preset distance value between the plurality of ultrasonic signals oscillating units, wherein when the ultrasonic signals are received by two or more ultrasonic signal reception units among the plurality of ultrasonic signal reception units, the microcomputer calculates reaching time taken for each ultrasonic signal to be received by the two or more ultrasonic signal reception units; selects two ultrasonic signal reception units which have received ultrasonic signals whose reaching time is the fastest, among the calculated reaching time values; and calculates a distance between the mobile robot and the charging station based on the reaching time of the ultrasonic signals which have been received by the two selected ultrasonic signal reception units.

7. The apparatus of claim 6, wherein when the ultrasonic signals are detected only in one of the ultrasonic signal reception units, the microcomputer calculates a distance value between the one of the ultrasonic signal reception units and the charging station based on a reaching time of each of the detected ultrasonic signals, and calculates an actual distance between the mobile robot and the charging station by adding a semidiameter of the mobile robot to the calculated distance value.

8. An apparatus for detecting a position of a mobile robot, the apparatus comprising:

an RF generating unit installed at a mobile robot and configured to emit an RF(Radio Frequency) signal at preset time intervals;

an RF reception unit installed at a charging station and configured to receive the RF signal emitted by the RF generating unit;

a plurality of ultrasonic signal oscillating units each installed at the charging station and for oscillating ultrasonic signals based on a point of time at which the radio frequency signal is emitted;

a control unit configured to control the ultrasonic signal oscillating units so that the ultrasonic signals are oscillated sequentially whenever the RF signal is received by the R.F reception unit;

a plurality of ultrasonic signal reception units each installed on an outer circumferential surface of the mobile robot and configured to receive the ultrasonic signals oscillated by the plurality of ultrasonic signal oscillating units; and a microcomputer installed in the mobile robot and configured to calculate a distance and an angle between the mobile robot and the charging station based on reaching time taken for each ultrasonic signal to reach the mobile robot and a preset distance value between the plurality of ultrasonic signals oscillating units, and to estimate a position of the mobile robot based on the calculated distance value and angle value.

wherein the microcomputer further comprises a storing unit configured to store position numbers for discriminating positions of the plurality of ultrasonic signal reception units, and detects a direction that the mobile robot proceeds through the stored position number of the ultrasonic signal reception unit which has received the ultrasonic signal first among the plurality of ultrasonic signal reception units.

9. The apparatus of claim 8, wherein the microcomputer compensates a position error of the mobile robot generated by sliding of the wheel or idle rotation based on the estimated position of the mobile robot.

10. The apparatus of claim 8, wherein the plurality of ultrasonic signal oscillating units are installed to be symmetric to each other in a horizontal direction of the charging station.

11. The apparatus of claim 8, wherein the plurality of ultrasonic signal oscillating units are installed to be symmetric to each other in vertical and horizontal directions at the charging station.

12. The apparatus of claim 8, wherein the microcomputer detects a reaching time taken for each ultrasonic signal to be received by one or more ultrasonic signal reception units among the plurality of ultrasonic signal reception units after being oscillated by the plurality of ultrasonic signal oscillating units on the basis of a point of time at which the RF signal is generated; calculates a distance between the mobile robot and the charging station based on the detected reaching time; and calculates an angle between the mobile robot and the charging station through triangulation based on the detected reaching time and the preset distance value between the plurality of ultrasonic signal oscillating units.

13. The apparatus of claim 8, wherein when the ultrasonic signals are detected only in one of the ultrasonic signal reception units, the microcomputer calculates a distance value between the one of the ultrasonic signal reception units and the charging station based on a reaching time of each of the detected ultrasonic signals, and calculates an actual distance between the mobile robot and the charging station by adding a semidiameter of the mobile robot to the calculated distance value, and wherein, when the ultrasonic signals are received by two or more ultrasonic signal reception units among the plurality of ultrasonic signal reception units, the microcomputer calculates reaching time taken for each ultrasonic signal to be received by the two or more ultrasonic signal reception units, selects two ultrasonic signal reception units which have received ultrasonic signals whose reaching time is the fastest, among the calculated reaching time values, and calculates a distance between the mobile robot and the charging station based on the reaching time of the ultrasonic signals which have been received by the two selected ultrasonic signal reception units.

14. The apparatus of claim 8, wherein when the ultrasonic signals are received by two or more ultrasonic reception units among the plurality of ultrasonic signal reception units, the microcomputer calculates a reaching time taken for each ultrasonic signal to be received by the two or more ultrasonic signal reception units; selects two ultrasonic signal reception units among the plurality of ultrasonic signal reception units which have received ultrasonic signals whose reaching time is the fastest, among the calculated reaching time values; and calculates a distance between the mobile robot and the charging station based on the reaching time of the ultrasonic signals which have been received by the two selected ultrasonic signal reception units.

15. The apparatus of claim 8, wherein the microcomputer detects the distance between the charging station and the mobile robot through expression $S=340[m/sec] \times (T1-T2)$, wherein 340[m/sec] is sound velocity, T1 is time taken to receive an ultrasonic signal, and T2 is time taken to oscillate an ultrasonic signal after receiving an RF signal.

* * * * *